Nov. 28, 1967   C. A. LEWIS ET AL   3,355,640
BI-DIRECTIONAL ELECTRICAL SERVO SYSTEM
Filed Jan. 16, 1964   3 Sheets-Sheet 1
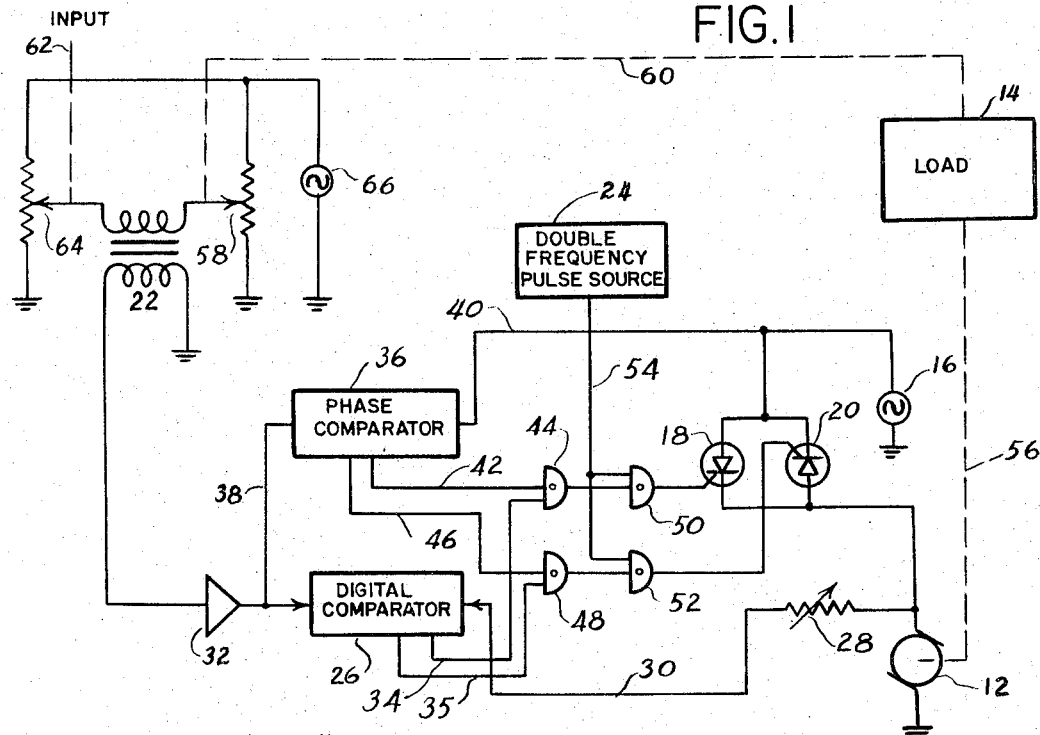
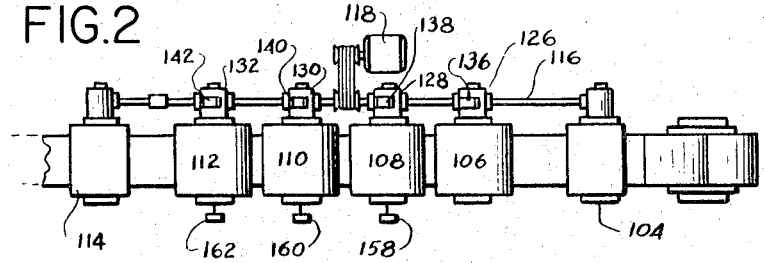
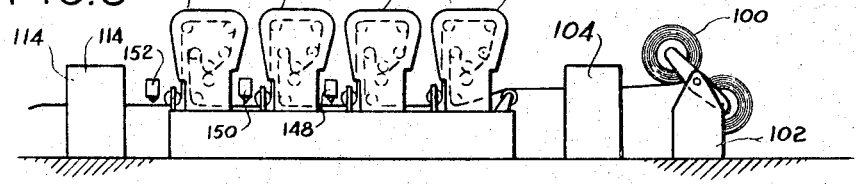
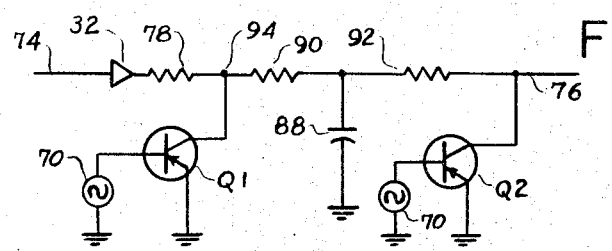
INVENTORS
CLARENCE A. LEWIS JR.
JAMES F. O'BRIEN
BY James and Franklin
ATTORNEYS

United States Patent Office 3,355,640
Patented Nov. 28, 1967

3,355,640
BI-DIRECTIONAL ELECTRICAL SERVO SYSTEM
Clarence A. Lewis, Kinnelon, and James F. O'Brien, Sussex, N.J., assignors to Champlain Company, Inc., Roseland, N.J., a corporation of New York
Filed Jan. 16, 1964, Ser. No. 338,204
11 Claims. (Cl. 318—18)

This invention relates to electrical servo systems, and more particularly to an AC carrier servo system using a DC motor.

The common practice in electrical servo systems is to use an AC carrier system with a two-phase AC motor generator. The generator provides a feedback of proper amount for damping needed to prevent an oscillatory response which is characteristic of high gain systems. Advantages of an AC carrier system are high gain, unaffected by drift, and operation from an AC supply without the need for conversion to DC power.

Disadvantages are that one phase must be constantly energized, resulting in large heat dissipation; the efficiency is very low, say 18% or less, and it is necessary to get rid of the dissipated heat to keep the equipment at a reasonable operating temperature; and if it be desired to run the two-phase motor from a single phase source, a very large capacitor is necessary to shift the fixed phase voltage approximately 90° with respect to the line voltage. This is practical only for small motors. For output rate stabilization a tachometer or generator is necessary to provide the output rate feedback voltage. This should be mounted integrally with the motor, because backlash can produce a limit cycle in high gain loops.

If these disadvantages preclude the use of an AC servo motor, the designer had no recourse other than to use a hydraulic controller. However, the apparatus described herein will operate like an AC servo motor generator, while using a DC motor without a generator, instead of an AC motor generator, and providing all the advantages and none of the disadvantages described earlier.

DC motors were used in relatively crude servo systems years ago, without an AC carrier system, but those systems had faults which led to the development of the AC carrier system with an AC motor generator. One such fault was that the drift of the DC amplifier and associated circuitry limited the accuracy. Another was that AC power had to be rectified before being used in the DC motor. More recently it has been suggested to use a DC motor controlled through silicon controlled rectifiers, the control being exercised by shifting the phase to supply the motor with desired fractional half cycles. This involves complicated circuitry, and does not provide an output rate feedback for stabilization.

The general object of the present invention is to improve AC carrier servo systems. Another object is to overcome the foregoing difficulties and to so use a DC motor that it also functions effectively as a generator to provide the desired output rate feedback. A further object is to supply the motor with substantially full width half cycles, but intermittently, and for varying intervals the duration of which lessens as the motor comes up to a desired speed. Differently expressed, the motor receives "bursts" of half waves, the length of the bursts becoming less as the motor approaches a desired speed. Still another object is to vary the said desired speed according to the magnitude of the error being corrected. A still further object is to make available full motor torque, if needed, regardless of the magnitude of the correction, that is, even when the error is small.

To accomplish the foregoing general objects, and other more specific objects which will hereinafter appear, our invention resides in the electrical servo system and the elements thereof and their relation one to another, as are hereinafter more particularly described in the following specification. The specification is accompanied by drawings, in which:

FIG. 1 is a block diagram showing a position servo feedback system embodying features of our invention;

FIG. 2 is a schematic plan view of a multi-color printing press line;

FIG. 3 is a front elevation of the same;

FIG. 4 is a fragmentary diagram showing a quadrature rejection circuit which may be used when needed;

Figure 5:
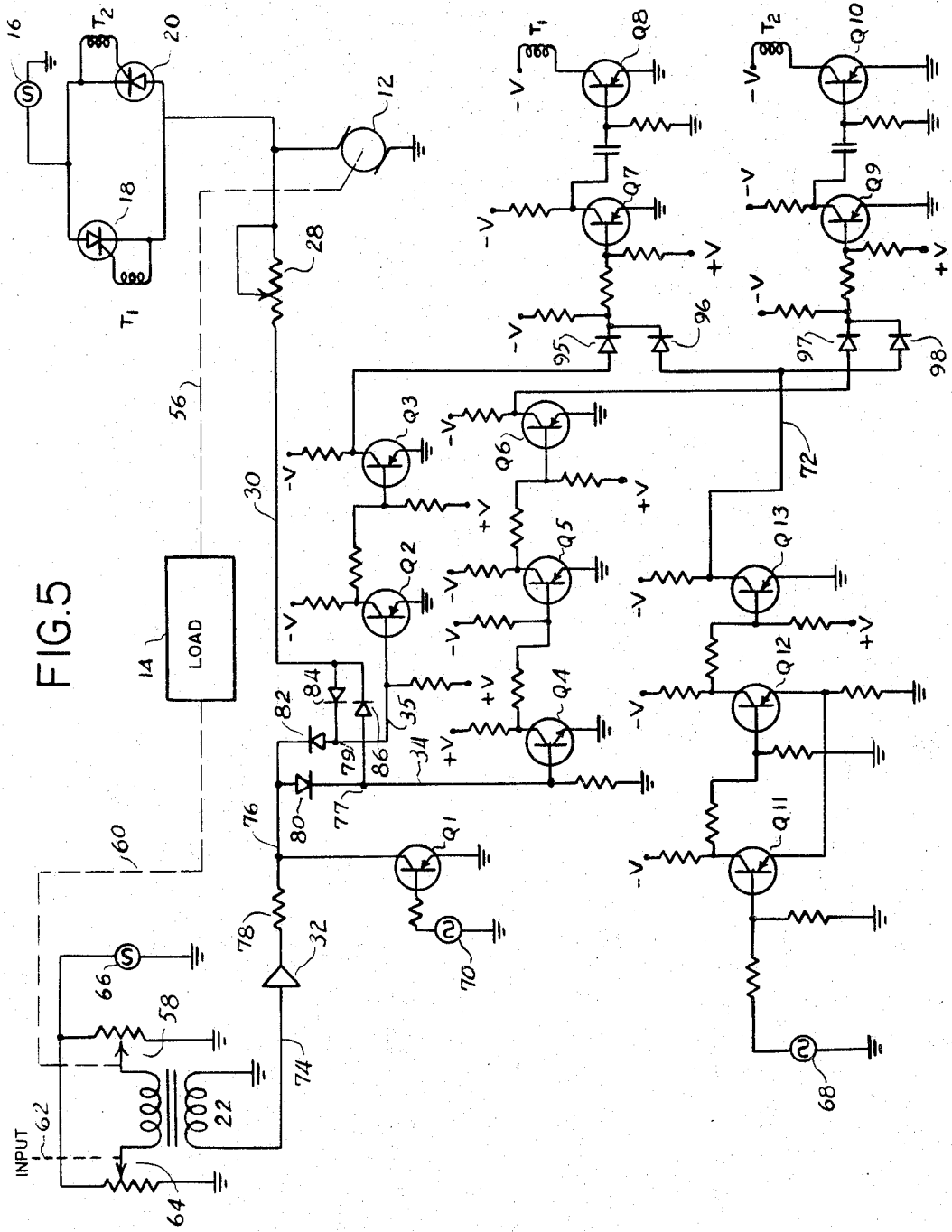
FIG. 5 is a wiring diagram corresponding to the block diagram shown in FIG. 1.

Referring to the drawing, and more particularly to FIG. 1, the servo system there shown comprises a DC servo motor 12 for moving a load 14 which may, for example, be an antenna or a machine tool. The DC motor 12 may be of any desired type. The field may be a permanent magnet field, or it may be shunt wound or series wound and excited by DC, usually from an AC line through rectifiers. Rectification in such case is no problem because only a small fraction of the power is needed for the field. For small motors a permanent magnet field would be preferred.

The armature 12 is energized from a conventional AC source indicated at 16, this being connected through either of two oppositely polarized silicon controlled rectifiers indicated at 18 and 20, to the armature of the motor. There is also a means 22 to supply a control signal or error signal. A double synchronous frequency pulse source 24 supplies AC pulses at double the frequency of the source 16. This supplies a pulse for each half cycle of the AC power supply. Usually these frequencies would be 60 and 120 cycles per second.

There is also a comparator circuit 26 to which the armature 12 is connected through a potentiometer 28 and conductor 30. The motor armature 12 acts as a generator during the non-energized half cycles, and thereby provides an output rate feedback which is supplied through the conductor 30 to the comparator 26. The control signal from 22 may be amplified at 32 and is opposed in the comparator circuit 26 by the feedback through conductor 30, to provide a logic error signal which is delivered at conductors 34 and 35. This is an on-off signal which is turned on solely when the error voltage exceeds the feedback voltage.

There is also a reference means 36 to determine the direction of the error signal. In the present case it is a phase comparator which compares the phase of the error signal coming through conductor 38 with the AC power supply 16, as indicated by connection 40. This selects either the positive half waves or negative half waves from the error signal to provide either a forward signal through conductor 42 to an "and" gate 44, or a reverse signal through conductor 46 to an "and" gate 48. The logic error signal from comparator 26 is supplied through conductors 34 and 35 to the "and" gates 44 and 48, one or the other of which is made conductive. The outputs are supplied to "and" gates 50 and 52 respectively, which are also connected through conductor 54 to the double frequency pulse source 24.

When the error signal exceeds the rate feedback, the logic signal from comparator 26, combined with the forward or reverse signal, causes a train of pulses to be applied to the gate lead of either silicon controlled rectifier 18 or 20, making one or the other conductive, and so energizing the DC motor 12 with a train of half waves. The direction of rotation depends on which rectifier is used. When the motor comes up to speed, so that the rate feedback equals or exceeds the error signal, the train of half waves is stopped. The motor then is deenergized and begins to slow down. If the error voltage again exceeds the feedback, there is another train of half waves, but ordinarily this is a train or "burst" of shorter duration. Only enough half waves arrive at the motor to keep it at desired speed.

The speed automatically reduces as the error decreases. This is so because the feedback voltage is compared with the error voltage, and when the error voltage is less, a smaller feedback voltage results in the desired equality at which the motor is deenergized. The smaller feedback voltage is delivered at a lower motor speed. Thus, the motor is turned in that direction which lessens the error signal, and at a rate dependent on the magnitude of the error signal.

Considering the arrangement in greater detail, the circuit shown is a position feedback servo system, and the motor 12 drives not only the load 14, through mechanical linkage indicated by dotted line 56, but also moves a follow-up potentiometer 58 through mechanical linkage indicated at 60. The input in the present case is applied at a mechanical connection indicated at 62 for positioning an input potentiometer 64.

It will be understood that in practice it is a matching of voltages rather than physical position, because the potentiometers would not necessarily have the same transfer function. For example, one might be linear and the other not. In any event, the error voltage is reduced as the correction takes place, and the speed of the motor is reduced as the error decreases. For any given error the energization (the length of the "bursts") is reduced as the servo motor comes up to speed for that error, and is maintained at a value which is just enough to maintain the desired speed for that magnitude of error. Because it is the almost or substantially full-width half waves that are turned on and off, these half waves all being of the same width, the same motor torque is always available if needed and to the extent needed for the desired speed.

Differently expressed, the DC motor is intermittently energized for varying intervals by substantially full-width half waves of alternating current of proper polarity to turn the armature in that direction which lessens the difference between the potentiometer voltages, and at a rate dependent on the magnitude of the difference or error, and at full torque.

The system of FIG. 1 is shown in greater detail in FIG. 5, referring to which the input 62, potentiometers 64 and 58, transformer 22, amplifier 32, load 14, AC power supply 16 and 66, silicon controlled rectifiers 18 and 20, DC motor 12, mechanical linkages 56 and 60, and feedback rate adjusting potentiometer 28, all correspond to the like numbered parts in FIG. 1.

The double frequency pulse source (in this case 120 cycle source) shown at 24 in FIG. 1, comprises in FIG. 5 the transistors Q11, Q12 and Q13. These three transistors provide a sharp pulse for each one-half of the wave form of the sixty-cycle power supply. This is indicated separately at 68, but in practice the supply 68 may be the same or derived from the other power supplies shown at 16, 66, and 70. Transistors Q11 and Q12 may be a conventional trigger circuit such as the Schmitt trigger circuit, and transistor Q13 acts as an amplifier, with an output to conductor 72. The output pulses which cause firing of the silicon controlled rectifiers are very fast (less than one microsecond).

The phase comparator shown by block 36 in FIG. 1 comprises in FIG. 5 the transistor Q1. This receives its reference potential from source 70, which again derives from the common AC source, as previously explained. The transistor Q1 is turned on and off by the reference voltage 70, so that the negative voltage wave forms of the error signal at 74 will appear at 76 if this error signal is out of phase with the reference voltage at 70; and the positive pulses will appear at 76 if the error voltage at 74 is in phase with the reference voltage at 70. In effect, the transistor conducts and acts as a short-circuit to ground for the undesired half wave, and opens for the desired half wave. Resistor 78 is merely to prevent distortion of the wave form coming from the amplifier 32.

The error and rate feedback comparator 26 shown in FIG. 1 comprises in FIG. 5 the diodes 80, 82, 84 and 86. The error signal is supplied through conductor 76; the rate feedback from the motor armature 12 is received from conductor 30; and the logic error signal is delivered on either conductor 34 or conductor 35, all as in FIG. 1. For positive error pulses at 76 the motor will be so energized that a negative voltage will appear on line 30, which voltage is compared through diode 86 with the error voltage through diode 80. If the error voltage is greater, a voltage appears on output line 34. For negative pulses at 76 the motor will be so energized that a positive voltage will appear on line 30, which voltage is compared through diode 84 with the error voltage through diode 82. If the error voltage is greater, a voltage appears on output line 35.

The forward "and" gate 44 in FIG. 1 comprises in FIG. 5 the transistors Q4, Q5, and Q6. The reverse "and" gate 48 in FIG. 1 is shown in FIG. 5 as the transistors Q2 and Q3. The "and" gate 50 in FIG. 1 comprises in FIG. 5 the transistors Q7 and Q8. The "and" gate 52 in FIG. 1 is shown in FIG. 5 as the transistors Q9 and Q10. The latter "and" gates (50 and 52) may be conventional. The "and" gate 44 differs from a conventional gate in that opposite polarity voltages are summed, and the gate is energized only if the absolute magnitude of the error signal is greater than that representing the rate feedback voltage. The "and" gates 44 and 48 in FIG. 1 are "conditional and gates," and in a sense may be considered to be a part of the comparator 26; or in FIG. 5, the corresponding five transistors Q2 through Q6 may be considered to be a part of the comparator utilizing the four diodes 80 through 86. The operation previously described whereby a voltage appears on either line 34 or line 35, shows what the comparator action is when the error signal is greater than the rate feedback signal. However, if the error signal ever should be less than the feedback signal, the conditional "and" gates are not energized.

In the three-transistor "and" gate the first transistor reverses polarity. The two-transistor "and" gate 48 is activated by a minus polarity. The three transistor "and" gate 44 is activated by a plus polarity. The error voltage must be greater in a positive sense to activate the three-transistor "and" gate; and the error voltage must be greater in a negative sense to activate the two-transistor "and" gate. If the error voltage is smaller, the gate is not activated at all.

The operation of the circuit of FIG. 5 may be reviewed as follows: The error voltage is supplied from transformer 22 to the AC amplifier 32. Transistor Q1 is turned on and off by a voltage which is in phase or 180° out of phase with the line voltage. Thus, at the point 76 there are ½ wave plus pulses or minus pulses, depending on the phase of the error voltage. The four diodes 80 through 86 make up a digital comparator which functions as follows: Assume initially the motor is at rest and that positive error voltage exists at point 76. This positive voltage appears at point 77 and turns transistor Q4 on. A logic 1 then appears at diode 97. Transistor Q5 changes the voltage polarity from plus to minus, and transistor Q6 acts as an inverter. A logic 1 appears at diode 98 through transistors Q11, Q12, and Q13, which make up the double frequency synchronous pulse source. At the instant that the logic 1 appears at diode 98, a pulse is transmitted through transistors Q9 and Q10 to transformer T2 and so to the gate lead of SCR 20. This pulse fires SCR 20 and the minus pulses of the power line are impressed on the DC motor armature, and the motor shaft starts to rotate. At the instant that the line voltage drops to a value such that the cathode of SCR 20 becomes positive with respect to its anode, it automatically turns off.

Meanwhile the motor acts as a generator because a DC voltage is generated and applied to line 30 which voltage is proportional to the speed of the armature shaft. This voltage is negative for the present example, and will be summed at point 77 through diode 86, with the original positive error voltage. If the armature voltage is less than the error voltage, SCR-20 is pulsed again, forcing the motor to run faster. At some point the armature voltage is large enough so that transistor Q4 is turned off, and SCR-20 is not pulsed. As the motor starts to slow down, transistor Q4 is turned on again, and SCR-20 is again pulsed. Thus, only enough pulses reach SCR-20 to cause the motor armature shaft to run at a speed proportional to the error voltage. The same reasoning will show that the motor will run similarly in the opposite direction, it then being pulsed through transistors Q2, Q3, Q7, Q8, diodes 95 and 96, transformer T1, and SCR 18.

The potentiometer 28 is used to vary the amount of rate feedback. Making the potentiometer resistance larger allows the motor to run faster for the same error voltage.

FIG. 5 shows one example of the system used as an AC servo with rate feedback accomplished by using a DC motor also as a generator. Other examples can be shown using different transducers such as synchros, resolver, and other AC devices. The circuitry beyond the amplifier 32 may be identical to that shown.

In some applications of the carrier servo system, quadrature voltage may present a problem. This a voltage shifted 90° and found to be present when the signal is null. More specifically, if inductive type transducers are used it is necessary to reject this quadrature voltage so that the motor is not subjected to spurious energization pulses.

Quadrature rejection circuitry is known but usually is complex in nature. In the present system the rejection circuit is greatly simplified because only half waves of the power supply are used, and only half wave rejection is needed. A rejection circuit is shown in FIG. 4, in which the points 74 and 76 correspond to the same numbers in FIG. 5, as does the amplifier 32, resistor 78 and transistor Q1. The circuit of FIG. 4 adds a transistor Q2, a fixed capacitor 88, and resistors 90 and 92. The circuit functions as follows:

As previously described, the purpose is to short and ground the undesired half waves but not the desired half waves delivered by amplifier 32. The resistor 90 and capacitor 88 will filter this voltage so that a DC voltage appears on the capacitor 88. The quadrature component appearing at point 94 at the line frequency is filtered to ground by the combination of capacitor 88 and resistor 90. Transistor Q2 in turn remodulates the DC voltage that appears on capacitor 88, and provides a half pulse train free from quadrature voltage at point 76. In effect, the transistor Q2 then becomes the shorting transistor, and is unaffected by quadrature voltage.

Figure 6:
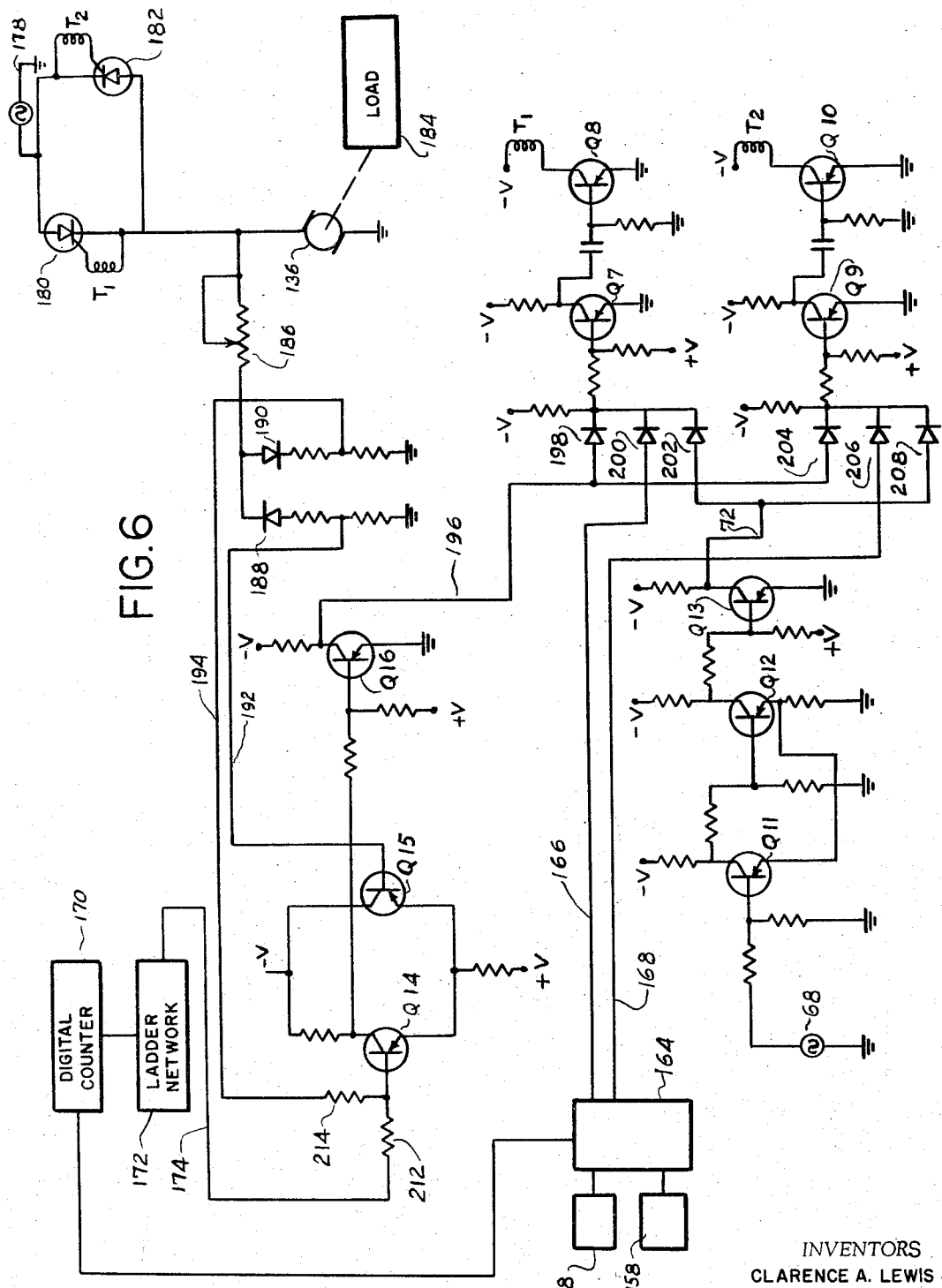
FIG. 6 is a partially schematic wiring diagram for another servo system embodying features of our invention and utilizable, for example, in the multi-color printing press line of FIGS. 2 and 3, in which data is sampled.

Still another form of our improved servo system is shown in FIG. 6. This may be used in sample data control systems, that is, when the error is detected at intervals by sampling. One example arises in multi-color printing on a moving web, where the accuracy of registration is checked at most once for each repeat length or printed impression on the sheet.

The registration system is not claimed herein, it being disclosed and claimed in our Patent No. 3,264,983 granted Aug. 9, 1966, and entitled "Registration System for a Moving Web."

Referring to FIGS. 2 and 3, we there show a multi-color printing line in which a web is drawn from roll 100 on a roll stand 102 and is drawn through a pull unit 104 which may be conventional. The web is then led into rotogravure printing units, each with its own dryer indicated at 106, 108, 110 and 112. The web leaving the last unit is drawn through a pull unit 114 and may be rewound or led to a cutting press for sheet delivery.

In accordance with known practice, the printing units are driven in synchronism by a main drive shaft 116 (FIG. 2) which is here shown driven by a motor 118. The same drive shaft may also drive the pull units 104 and 114. This establishes an approximate synchronism, but for perfect color-to-color register, a slight additional or corrective motion is fed into one or another unit as required in response to electric eye scanning. For this purpose, the drive from main drive shaft 116 to each unit includes a so-called "running register" which includes differential gearing housed at 126, 128, 130 and 132. A small reversible correction motor may be used to add or subtract the correction needed, the correction motors being indicated at 136, 138, 140 and 142 respectively. A suitable marker on the web, or a leading or trailing edge of the printed impression, is scanned by suitable scanning heads indicated in FIG. 3 at 148, 150 and 152. This may be compared with another marker on the web, or more usually with reference to the rotative position of the printing cylinder. A pulse unit for this purpose may be referred to as a "phase micrometer," and is indicated in FIG. 2 at 158, 160 and 162. The rotating part is turned with the rotogravure cylinder.

The pulse outputs of the scanners and phase micrometers are led to a computer (not shown in FIGS. 2 and 3) from which appropriate current is supplied to the correction motors.

Referring now to FIG. 6 of the drawing, the circuitry shown may be used for register correction of one of the printing units. One of the scanning heads is indicated at 148, and the corresponding phase micrometer is indicated at 158. Their pulses go to a digital computer 164 which is not shown in detail, it being described in our aforesaid copending Pat. No. 3,264,983. Generally speaking, it computes the register error, and the direction that the correction should take to eliminate the error. For a forward correction, a signal appears on line 166, and for a reverse correction it appears on line 168. The magnitude of the error is calculated and stored in a digital counter 170. This error is converted through a ladder network 172 so that a voltage appears on line 174, which voltage is proportional to the magnitude of the error stored in counter 170.

The servo system again comprises a DC servo motor 136 and an AC source 178 connected through two oppositely polarized silicon controlled rectifiers 180 and 182 to the armature of the motor. This motor is one of the correction motors shown in FIG. 2, and feeds corrective motion to the printing cylinder, here indicated more generally as a load at 184. The counter 170 and ladder network 172 provide digital information storage and conversion circuitry which provides a control signal on line 174. The computer 164 provides a forward or reverse signal on lines 166 and 168 respectively.

The motor armature 136, in the non-energized half cycles, is used as a generator to provide an output rate feedback through potentiometer 186. A potential coming through either of diodes 188 and 190 on either line 192 or 194 is compared to the control signal coming through line 174, to provide a logic control signal which appears at conductor 196 whenever the feedback voltage is less than the error voltage.

Here again there is a synchronous double frequency pulse source which again may be a Schmitt trigger circuit and an amplifier, indicated by transistors Q11, Q12 and Q13, operating from source 68, exactly as previously described in connection with FIG. 5.

There is an "and" gate represented as before by transistors Q7 and Q8 which responds to a logic error signal through diode 198, and a forward signal from line 166 through diode 200, and the double frequency from wire 72 through 202. There is a similar "and" gate represented by transistors Q9 and Q10 which receives a logic error signal from line 196 through diode 204, and the reverse signal from line 168 through diode 206, and the double frequency pulses from wire 72 through diode 208. The output of the one "and" gate or the other is supplied through transformer T1 or T2 to the gate leads of silicon controlled rectifiers 180 or 182. As before, the arrangement is such that the DC motor is intermittently energized for varying intervals by half waves of AC of proper polarity to turn the motor in that direction required to lessen the error, and a rate dependent on the magnitude of the error, and at full torque.

The comparator for comparing the error voltage appearing on line 174 with the rate feedback voltage appearing at potentiometer 186 from motor 136 comprises transistors Q14, Q15, Q16, and diodes 188 and 190, and resistors 212 and 214. If the rate feedback voltage from motor 136 is positive, a positive voltage appears through diode 190 and on line 194. This voltage is compared through resistor 214 with the negative error voltage appearing from line 174 through resistor 212. If the error voltage is greater than the output rate voltage, a negative voltage appears at transistor Q14, which turns transistor Q16 off, thereby activating diodes 198 and 204, and applying inputs through diodes 198 and 204 to the "and" gates. Transistors Q14 and Q15 constitute a high gain differential amplifier which turns Q16 off when the error voltage is greater than the output rate voltage, thus providing a desired logic control signal. If a negative output rate voltage from the motor 136 appears at potentiometer 186, a negative voltage appears through diode 188 and on line 192. The negative error voltage appears at resistor 212, and if it is greater than the output rate voltage, the transistor Q14 is turned on through transistor Q15, and transistor Q14 as before turns transistor Q16 off, thereby activating diodes 198 and 204 through line 196. The diodes 188 and 190 discriminate as to the direction of motor rotation.

To summarize the operation, the circuitry requires three inputs. The direction is indicated as a logic 1 at diode 200 for one direction, or a logic 1 at diode 206 for the other direction. A second input is the double frequency pulse through diodes 202 and 208. The third input is a number representing the error which is stored in the counter. Given this information, the system shown produces a motor shaft speed proportional to the magnitude of the error stored in the counter, the direction of rotation depending upon whether diode 200 or 206 receives a logic 1. The output of the ladder network 172 is always a negative voltage proportional to the register error. The direction of the error is determined by the computer 164.

The error voltage being always negative, the circuit is concerned only with its absolute magnitude. If the armature feedback voltage is negative, the flow is through diode 188 and line 192 to the base of transistor Q15. The resistor 214 is not involved, there being no flow through diode 190 and wire 194. The transistors Q14 and Q15 act as a comparator, and if the negative error voltage is greater than the negative armature voltage then transistor Q14 activates transistor Q16 and a signal is supplied through line 196 to diodes 198 and 204.

If the armature feedback voltage is positive, it then flows through diode 190 to line 194 and resistor 214. The resistors act as a resistor summing network. If the negative error voltage is greater, it causes transistor Q14 to activate transistor Q16, and power is supplied to the motor. If the positive feedback voltage is greater than the negative error voltage, it causes the transistor Q14 to turn the transistor Q16 off, and no pulses are supplied to the silicon controlled rectifiers and no power is supplied to the motor. The same result obtains if the negative feedback voltage is greater than the negative error voltage.

The variable is a position error (register error on the printed web), thus making the system function as an integrator, that is, the output shaft of the motor is the integral of the error times a scale factor.

There are certain types of radar antenna tracking equipment where the subject controller may be utilized. Radar information occurs in pulses, thus making any control system respond to sampled data. If it be desired to move a missile pedestal to a position predicted by a computer, it is extremely difficult to obtain a smooth motion with hydraulic equipment presently used. If we continuously update the counter with the computed velocity, the motor itself would filter out the harmonics caused by sampling, resulting in a very smooth motion of the pedestal.

It is believed that the construction, operation and method of use of our improved servo system, as well as the advantages thereof, will be apparent from the foregoing detailed description. The system provides high gain, and is unaffected by drift. An ordinary DC motor may be employed, and is operated from an AC supply without the need for an ordinary AC to DC power supply. No separate tachometer or generator is needed for rate feedback, and yet accurate rate feedback is provided. The correction of an error is performed at high speed when the error is large, and at diminishing speed as the error is lessened, so that the control is accurate and fast and yet does not overshoot. If needed, maximum motor torque is available for even the smallest error because full power then is supplied. This is important because the load, for example the motion of the rotogravure cylinder, may be just as big when the error is small as when it is large. Heretofore, hydraulic systems have been used to meet this problem, but the present system is entirely electrical, and yet provides precision high torque correction without hunting. The circuitry may use solid state components, and is stable.

It will be understood that while we have shown and described our invention in several preferred forms, changes may be made without departing from the scope of the invention, as sought to be defined in the following claims. In the claims, reference to a silicon controlled rectifier is not intended to exclude a solid state controlled or gated rectifier using some metal other than silicon in the event of development of such an equivalent rectifier.

We claim:

1. A servo system comprising a DC servo motor to move a load, an AC power source connected through either of two oppositely polarized silicon controlled rectifiers to the armature of said motor, a synchronous pulse source having a frequency which is double that of the AC power source, means to supply an error signal, said motor armature being used to supply an output rate feedback, means to receive and to compare the error signal and the feedback, and means responsive to an excess of error signal over feedback to supply the double frequency pulse to the gate lead of one silicon controlled rectifier or the other in order to supply a train of substantially full width alternate and therefore unidirectional half waves which turns the motor in that direction which lessens the error signal.

2. A servo system comprising a DC servo motor to move a load, an AC power source connected through either of two oppositely polarized silicon controlled rectifiers to the armature of said motor, a comparator circuit, means to supply a control signal to said comparator circuit, reference means to determine the direction of the control signal, a synchronous pulse source having a frequency which is double that of the AC power source, the said motor armature being used as a generator to provide an output rate feedback to said comparator circuit, the control signal and the output rate feedback being opposed in said comparator circuit to provide a logic control signal, and means responsive to the logic control signal to intermittently and for varying intervals supply the double frequency pulse to the gate lead of one silicon controlled rectifier or the other in order to supply a train of substantially full width alternate and therefore unidirectional half-waves to the armature to turn the motor in desired direction.

3. A servo system comprising a DC servo motor to move a load, an AC power source connected through either of two oppositely polarized silicon controlled rectifiers to the armature of said motor, a comparator circuit, means including a digital network to supply a control signal to said comparator circuit, reference means to determine the direction of the control signal, a synchronous pulse source having a frequency which is double that of the AC power source, the said motor armature during the non-energized half cycles being used as a generator to provide an output rate feedback to said comparator circuit, the control signal and the output rate feedback being opposed in said comparator circuit to provide a logic control signal, and means responsive to the logic control singal to intermittently and for varying intervals supply the double frequency pulses to the gate lead of one silicon controlled rectifier or the other in order to supply in-phase alternate and therefore unidirectional half waves from the AC power source to turn the motor in desired direction and at desired speed.

4. A servo system comprising a DC servo motor to move a load, an AC power source connected through either of two oppositely polarized silicon controlled rectifiers to the armature of said motor, a comparator circuit, means to supply an error signal to said comparator circuit, reference means to determine the direction of the error, a synchronous pulse source having a frequency which is double that of the AC power source, the said motor armature being used as a generator to provide an output rate feedback to said comparator circuit, the error signal and the output rate feedback being opposed in said comparator circuit to provide a logic error signal, and means responsive to the logic error signal to intermittently and for varying intervals supply the pulses to the gate lead of one silicon controlled rectifier or the other in order to supply substantially full width alternate and therefore unidirectional half waves from the AC power source to turn the motor at needed torque in that direction which lessens the error signal and at a rate dependent on the magnitude of the error.

5. A servo system comprising a DC servo motor to move a load, an AC power source connected through either of two oppositely polarized silicon controlled rectifiers to the armature of said motor, means to provide an error signal, a comparator circuit receiving said error signal, said motor armature being used as a generator to provide an output rate feedback which is connected to said comparator circuit in opposition to the error signal to produce a logic error signal, two "and" gates, a phase comparator to determine the direction of the error signal in order to feed the logic error signal to one "and" gate or the other, a synchronous pulse source having a frequency which is double that of the AC power source connected to said "and" gates, means supplying the double frequency pulse output of one or the other of said "and" gates to the gate lead of one or the other of the silicon controlled rectifiers, the arrangement being such that the DC motor is intermittently energized for varying intervals by alternate and therefore unidirectional half waves of AC power of proper polarity to turn the armature at needed torque in that direction which lessens the error, and at a rate dependent on the magnitude of the error.

6. A position feedback servo system comprising a DC servo motor to move a load and to move a follow up element, an AC power source connected through either of two oppositely polarized silicon controlled rectifiers to the armature of said motor, a movable input element, an AC source so connected to and varied by said elements as to provide a proportional error signal resulting from the difference in the positions of the elements, a comparator circuit receiving said error signal, said motor armature being used as a generator to provide an output rate feedback which is connected to said comparator circuit in opposition to the proportional error signal to produce a logic error signal, two "and" gates, a phase comparator to determine the direction of the proportional error signal in order to feed the logic error signal to one "and" gate or the other, a synchronous pulse source having a frequency which is double that of the AC power source connected to said "and" gates, means supplying the double frequency pulse output of one or the other of said "and" gates to the gate lead of one or the other of the silicon-controlled rectifiers, the arrangement being such that the DC motor is intermittently energized for varying intervals by alternate and therefore unidirectional half waves of AC power of proper polarity to turn the armature in that direction which lessens the difference between the positions of the elements, and at a rate dependent on the magnitude of the difference.

7. A position feedback servo system comprising a DC servo motor to move a load and to move a follow up potentiometer, an AC power source connected through either of two oppositely polarized silicon controlled rectifiers to the armature of said motor, an input potentiometer, an AC source connected to said potentiometers, a comparator circuit supplied with and responsive to any error signal resulting from the difference in the potentiometer positions, said motor armature during the non-energized half cycles being used as a generator to provide an output rate feedback which is connected to said comparator circuit in opposition to the error signal to produce a logic error signal, two "and" gates, a phase comparator to determine the direction of the error signal in order to feed the logic error signal to one "and" gate or the other, a synchronous pulse source having a frequency which is double that of the AC power source connected to said "and" gates, means supplying the pulse output of one or the other of said "and" gates to the gate lead of one or the other of silicon controlled rectifiers, the arrangement being such that the DC motor is intermittently energized for varying intervals by alternate and therefore unidirectional half waves of AC power of proper polarity to turn the armature in that direction which lessens the difference between the potentiometer voltages, and at a rate dependent on the magnitude of the difference.

8. A servo system comprising a DC servo motor to move a load, an AC power source connected through two oppositely polarized silicon controlled rectifiers to the armature of said motor, digital information storage and conversion circuitry to provide a control signal, means to provide a forward or reverse signal, said motor armature being used as a generator to provide an output rate feedback, means to compare the feedback to the control signal to provide a logic control signal, a synchronous pulse source having a frequency which is double that of the AC power source, "and" gates receiving said logic control signal and said forward signal and said double frequency pulse, "and" gates receiving said logic error signal and said reverse signal and said double frequency pulse, connections supplying the double frequency output of one or the other set of "and" gates to the gate lead of a respective one of the aforesaid two silicon controlled rectifiers, the arrangement being such that the DC motor is intermittently energized for varying intervals by substantially full width alternate and therefore unidirectional half waves of AC power of proper polarity to turn the armature in desired direction and at a desired rate.

9. A servo system comprising a DC servo motor to move a load, an AC power source connected through two oppositely polarized silicon controlled rectifiers to the armature of said motor, digital information storage and conversion circuitry to provide an error signal, means to provide a forward or reverse signal, appropriate to reduce the error said motor armature during the non-energized half cycles being used as a generator to provide an output rate feedback which is opposed to the error signal to provide a logic error signal, a synchronous pulse source having a frequency which is double that of the AC power source, "and" gates receiving said logic error signal and said forward signal and said double frequency pulse, "and" gates receiving said logic error signal and said reverse signal and said double frequency pulse, connections supplying the double frequency output of one or the other set of "and" gates to the gate lead of a respective one of the aforesaid two silicon controlled rectifiers, the arrangement being such that the DC motor is intermittently energized for varying intervals by substantially full width alternate and therefore unidirectional half waves of AC power of proper polarity to turn the armature at needed torque in that direction which lessens the error, and at a rate dependent on the magnitude of the error.

10. The method of operating a servo system comprising a DC servo motor and an AC power source which includes comparing an output rate feedback voltage from the motor armature with a proportional error voltage, feeding substantial full-width alternate and therefore unidirectional half waves from the AC power source to the armature to drive the motor when the error signal is greater than the feedback voltage, using the alternate and therefore unidirectional half waves of one polarity or the other to determine the motor direction according to the direction of the error, until the armature generates an output rate feedback voltage which equals the error voltage, thereupon stopping the supply of power half waves until the motor speed lessens and the error voltage again is greater, thereupon resuming the supply of substantially full width alternate and therefore unidirectional power half waves from the source to the motor, and so on, the motor speed lessening automatically as the error is reduced, but the motor having full torque whenever it is energized.

11. A servo system comprising a DC servo motor, an AC power source, means to supply a proportional error voltage, means to compare an output rate feedback voltage from the motor armature with the proportional error voltage, means to feed substantial full-width alternate and therefore unidirectional half waves from the AC power source to the armature to drive the motor when the error voltage is greater than the feedback voltage, said means feeding half waves of one polarity or the other to determine the motor direction according to the direction of the error, until the armature generates an output rate feedback voltage which equals the error voltage, whereupon the supply of power half waves is stopped until the motor speed lessens and the error voltage again is greater, said means thereupon resuming the supply of substantially full width alternate and therefore unidirectional power half waves from the source to the motor, and so on, the arrangement being such that the motor speed is automatically lessened as the error is reduced, but the motor having full torque whenever it is being energized from the AC power source.

References Cited

UNITED STATES PATENTS

| | | | |
|---|---|---|---|
| 2,977,523 | 3/1961 | Cockrell | 318—34 X |
| 3,181,046 | 4/1965 | Sutton | 318—28 |
| 3,211,794 | 10/1965 | Rhodes | 318—18 |
| 3,249,840 | 5/1966 | Eriksson et al. | 318—345 X |

BENJAMIN DOBECK, *Primary Examiner.*

ORIS L. RADER, *Examiner.*